(12) United States Patent
Majeric

(10) Patent No.: US 11,220,440 B2
(45) Date of Patent: Jan. 11, 2022

(54) SYSTEM AND A METHOD FOR PURIFYING WASTE WATER IN MOBILE HOMES

(71) Applicant: VAPROMAX d.o.o., Prestranek (SI)

(72) Inventor: Vilko Majeric, Prestranek (SI)

(73) Assignee: Vapromax d.o.o.

( * ) Notice: Subject to any disclaimer, the term of this patent is extended or adjusted under 35 U.S.C. 154(b) by 0 days.

(21) Appl. No.: 16/904,782

(22) Filed: Jun. 18, 2020

(65) Prior Publication Data
US 2020/0399142 A1    Dec. 24, 2020

(30) Foreign Application Priority Data

Jun. 19, 2019   (EP) .................................... 19181239

(51) Int. Cl.
*C02F 1/04*    (2006.01)
*B01D 1/00*    (2006.01)
(Continued)

(52) U.S. Cl.
CPC ............ *C02F 1/048* (2013.01); *B01D 1/0023* (2013.01); *B01D 1/0035* (2013.01); *B01D 1/0082* (2013.01); *B01D 5/006* (2013.01); *C02F 1/006* (2013.01); *C02F 1/008* (2013.01); *C02F 2103/002* (2013.01); *C02F 2103/005* (2013.01);
(Continued)

(58) Field of Classification Search
CPC .......... C02F 1/006; C02F 1/008; C02F 1/048; C02F 2103/002; C02F 2103/005; C02F 2201/008; C02F 2209/005; C02F 2209/02; C02F 2209/42; C02F 2209/44;
(Continued)

(56) References Cited

U.S. PATENT DOCUMENTS 3,622,511 A * 11/1971 Pizzo .................... C02F 11/06
                                                   210/754
3,733,617 A *  5/1973 Bennett ................... B63J 4/006
                                                     4/315
(Continued)

FOREIGN PATENT DOCUMENTS

DE    10 2015 222 989    5/2017
EP         2 052 940     4/2009
(Continued)

OTHER PUBLICATIONS

European Search Report for corresponding EP Patent Application 19181239.5.

*Primary Examiner* — Jonathan Miller
(74) *Attorney, Agent, or Firm* — Voyer Law

(57) ABSTRACT

A system, device, and method for treating waste water in mobile homes by cleaning waste water in toilets and/or reservoirs in motorhomes, boats, camp trailers and similar mobile homes. The system comprises a combining tank for receiving waste water from grey and black tanks, a pump for pumping the waste water, the pump having a mill and being connected to the waste water tank with a first pipe, an evaporator having a heating source for increasing the temperature of the waste water so that it vaporizes, the evaporator being connected to the heated pump, a separator for separating the vapour and dry particles, a condensor for condensing the vapour, a reservoir for the purified water for collecting the condensed vapour, an electronic controller for controlling the treatment process performed by the device/system.

10 Claims, 4 Drawing Sheets

Figure 1:
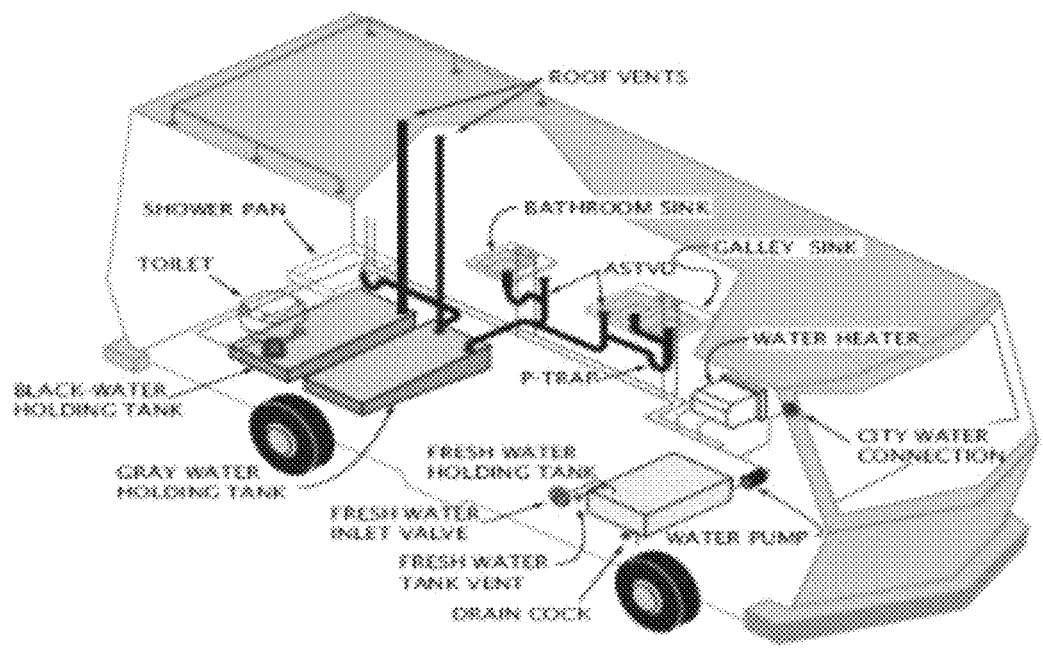

(51) Int. Cl.
*B01D 5/00* (2006.01)
*C02F 1/00* (2006.01)
*C02F 103/00* (2006.01)

(52) U.S. Cl.
CPC .. *C02F 2201/008* (2013.01); *C02F 2209/005* (2013.01); *C02F 2209/02* (2013.01); *C02F 2209/42* (2013.01); *C02F 2209/44* (2013.01)

(58) Field of Classification Search
CPC .. B01D 1/0023; B01D 1/0035; B01D 1/0082; B01D 5/006
See application file for complete search history.

(56) References Cited

U.S. PATENT DOCUMENTS

| | | | | |
|---|---|---|---|---|
| 3,821,107 A | * | 6/1974 | Peoples | C02F 1/048 210/612 |
| 3,868,731 A | * | 3/1975 | Stahl | E03D 11/11 4/318 |
| 3,956,126 A | * | 5/1976 | Streebin | C02F 1/048 210/104 |
| 3,974,075 A | * | 8/1976 | Saigh | B63J 4/006 210/86 |
| 4,012,322 A | * | 3/1977 | Saigh | B63J 4/006 210/86 |
| 4,161,792 A | * | 7/1979 | Dallen | F23G 7/001 4/111.1 |
| 6,106,703 A | * | 8/2000 | Nassef | B63J 4/006 210/103 |
| 6,299,775 B1 | * | 10/2001 | Elston | C02F 9/00 210/605 |
| 6,412,121 B2 | * | 7/2002 | Motoyama | B01D 1/0017 4/317 |
| 7,211,187 B2 | * | 5/2007 | Lumbert | C02F 11/12 210/153 |
| 7,413,650 B2 | * | 8/2008 | Lumbert | C02F 11/12 210/153 |
| 2001/0047538 A1 | | 12/2001 | Motoyama | |
| 2006/0091083 A1 | * | 5/2006 | Lumbert | C02F 1/78 210/760 |
| 2012/0228117 A1 | * | 9/2012 | Panunzio | C02F 9/00 203/10 |
| 2019/0284074 A1 | | 9/2019 | Siess et al. | |
| 2019/0352194 A1 | * | 11/2019 | Thiers | C02F 1/265 |

FOREIGN PATENT DOCUMENTS

| | | |
|---|---|---|
| KR | 20180089718 | 8/2018 |
| SE | 527049 | 12/2005 |
| WO | 2014/162293 | 10/2014 |
| WO | 2017207494 | 7/2017 |

\* cited by examiner

SYSTEM AND A METHOD FOR PURIFYING WASTE WATER IN MOBILE HOMES

FIELD OF INVENTION

The present invention belongs to the field of treatment of water and waste water, more precisely to the field of waste water treatment by heating. The subject matter is also associated with installations for fresh and waste water and treatment with heating as well as drying the waste water. The invention relates to a system and a method for purifying waste water in toilets and/or reservoirs in motorhomes, boats, camp trailers and similar mobile homes.

BACKGROUND OF THE INVENTION AND THE TECHNICAL PROBLEM

Mobile homes such as motorhomes, campers, trailers and boats due to their mobility have a different water supply and outlet as regular homes. Thus, they employ various kinds of storage tanks such as cassettes or reservoirs, in which water for drinking and/or washing or flushing a toilet is stored. The waste water is also stored in special holding tanks or reservoirs. Supply lines that move the water to access points such as faucets, taps, bathtubs, sinks, etc. and drainage lines, through which waste and other undesirable substance are drained, are connected to the mentioned reservoirs. In most mobile homes the supply lines consist of PEX or copper and are smaller at around 1 to 2 cm in diameter. Drainage pipes are larger to transport solids and other accumulated waste so are usually 5 to 10 cm in diameter. They usually consist of PVC or copper pipes.

During use of a mobile home water circulation may be ensured at a campsite or mooring and achieve a constant water circulation. However, when at dry camping or at open sea, the water and waste water storage tanks have utmost importance. Refiling, draining or emptying of water storage tanks need proper planning.

Water storage tanks come in different sizes and are usually three one for fresh water, one grey water tank and one black water tank.

The fresh water holding tank is the largest of the three types and is mostly made of a plastic material. They are filled and drained through an inlet and/or an outlet and should only be filled with drinkable water.

The grey tank is designed to collect and store the water that goes down the sink and shower drains and from a clothes washer if present. This water has soap and detergent but no sewage. These tanks should be emptied at special dump stations.

The black water tank holds the water that goes down the toilet of the mobile home.

Both the black and grey tanks are vented to a fitting on the roof of the mobile home, similarly as in regular homes, to limit the odour. These tanks also have the most solids and chemicals, as there are numerous chemicals to add to black tanks in order to limit odours. Same as for the grey tanks, they should be drained as special stations.

Emptying the water tanks is a procedure comprised of several steps:
 fitting a pipe to a nozzle or a valve for draining the waste water;
 opening the valve;
 letting the water drain through the pipe; and
 once the tank is empty, closing the valve and removing the pipe.

The black water tank can also be flushed with a grey water tank.

This is a lengthy and unpleasant procedure, which has to be performed at special sites.

Good planning is needed to avoid dumping at unwanted places or exhausting all water supplies.

Therefore, it would be beneficial if the water inside water tanks could be purified by a suitable process or a purifying system, which would limit the amount of waste water and the need for draining the tanks. The technical problem is thus to provide a purifying system to be installed into a mobile home such as a motorhome, a camper, boat and similar, which should efficiently purify wastewater while minimally complicating the water supply system of the mobile home. The aim of the invention is to limit the amount of water needed for operation of toilets as well as lowering the amount of waste water and thus improving use of the mobile home.

STATE OF THE ART

Patent application KR20180089718 discloses a mobile food stand having a cleaning water recycling device, the latter comprises a heated outer casing, an outer casing cover, an inner casing, an insulating filler material, first and second partition walls vertically spaced apart from each other on a bottom surface of the inner casing, a cleaning water tank, a recycled cleaning water tank, a purification tank, a feed water pump, a first valve, a second valve, a waste water recovery pump, a recycling pump, a third valve, and a water quality sensor; and a controller, so that cleaning water is repeatedly recycled. This solution is not adapted for treatment of sewage waste water in mobile homes and differs from the present solution in the design and some components.

Patent SE527049 describes a water purification device for wastewater on a boat, which includes intermediate chambers between flotation separation chamber outlet and purified water outlet. Intermediate chambers are formed between the separation chamber outlet opening and the purified water outlet in the treatment vessel by partition walls extending between the inside of the purification vessel and the outside of this chamber. A water purification device for a boat comprises a closed vessel with an inlet for wastewater, an outlet for purified water and an outlet in the upper part of the vessel for removing sludge formed during flotation. The vessel contains a separation chamber and a vertical pipe extending from the bottom of this chamber to a point inside this chamber beneath the upper part from where sludge is removed. This solution differs from the present invention in that it uses a different technique to purify the waste water.

Patent application WO2017207494 discloses a method for treating wastewater containing organic matter and/or wet waste containing organic matter, in particular for treating sanitary wastewater in trains. The method comprises the following steps:
 a) cleaning the wastewater containing matter and/or the wet waste containing organic matter, in particular the sanitary wastewater in trains, in a bioreactor,
 b) feeding the wastewater at least partially purified in the bioreactor into a conditioning system,
 c) at least partially separating phases of the partially purified wastewater in the conditioning system,
 d) obtaining a liquid fraction and a solid fraction of the at least partially purified wastewater.

This solution differs from the present invention in that the latter does not include bioreactors, as they are not desired in mobile homes.

DESCRIPTION OF THE SOLUTION OF THE TECHNICAL PROBLEM

The present invention relates to a system for cleaning waste water from toilet reservoirs (black water tanks) and/or waste water from other reservoirs (grey water tanks) of mobile homes such as motorhomes, campers, trailers and boats. The essence of the invention is the water system in mobile homes is provided with additional tanks for heat treatment purification of waste water from grey and black reservoirs, so that it can be reused, while the solid particles are led into a special canister for waste, which can be emptied at any waste dumping site. The system for purifying waste water in mobile homes according to the invention comprises:
- a combining tank water arranged to combine waste water from the black, grey or both waste water tanks;
- a pump for pumping the waste water from the black and/or grey water tanks into combining tank and then into the evaporator, the pump having a mill and being connected to the combining tank with a first pipe;
- an evaporator having a heating source for increasing the temperature of the waste water so that it vaporizes, the evaporator being connected to the combining tank with a second pipe, wherein the solid particles after evaporation are led to a container for solid waste with a conveyor;
- preferably a device for measuring the level of waste water installed on the outer side of the evaporator for measuring the level of waste water in the evaporator; the device preferably has a magnetic switch, which turns on the pump when the water level is low and turns off the pump when the water level is high, wherein these values are pre-set depending on the evaporator size;
- a separator for separating the vapour and water drops, the separator being installed downstream of the evaporator;
- a condensor for condensing the vapour being installed downstream of the separator, the condensor being cooled by a suitable cooling device, preferably a fan;
- a reservoir for the purified water for collecting the condensed vapour; and
- optionally an electronic controller for controlling the treatment process performed by the system.

The combining tank is located upstream of the evaporator and is preferably partly heated by the steam generated in the evaporator. This elevates the temperature of the waste water in the combining tank, which means that less energy is needed for its heating in the evaporator leading to more optimal performance of the system. The evaporator is preferably a canister made from a material resistant to rust, preferably stainless steel, in which the heating source and the separator are housed. The heating source may be an electric heater, oil burner, gas burner or heater working on solar energy, preferably an electric heater. It can be powered from the mobile home itself or with an external power supply device. The heating source is preferably heating an intermediate element such as a rounded pipe in the evaporator, with which the waste water comes into contact. The temperature reached in the evaporator is from 110 to 140° C. The separator is an empty container with holes in the direction of the evaporator and holes in the direction of the condensor. The separator also has an outflow hole intended to lead the water drops back into the evaporator. The steam travels from the evaporator and continues its motion towards the condensor. Possible water drops fall onto the bottom of the separator and when a suitable amount of collected water drops is accumulated, they are returned to the evaporator. The solid particles created in the evaporator are transported with a conveyor, preferably a spiral brush usually mounted next to the heated pipe inside the evaporator, towards a canister for waste, which can be accessed easily by the user of the mobile home and can be regularly emptied.

Preferably, the system also has a container for solid wastes, which can be easily taken out of the system and emptied into trash cans. The system may also have a connecting pipe between the reservoir for the purified water and the storage tank for water, which is not drinkable.

The pipes, which connect all components of the system are made of any suitable material such as copper, iron, plastic material, glass material, and carbon fibres, preferably copper or plastic material, wherein the pipe between the condensor and evaporator is made of copper.

The controller is preferably a programmable logic controller (PLC), which controls the treatment process performed by the system, especially the heater in the evaporator and the pumps based on the temperature of water in the evaporator, level of waste water and time. Usually, the user of the mobile home does not have external influence on the controller as it is pre-programmed.

The system performs a waste water purifying process comprising the following steps:
a) the pump with its electric mill pumps the waste water from a combining tank and through a pipe into the evaporator;
b) increasing the temperature in the evaporator and evaporating the pumped waste water, wherein the solids are transported into a canister for waste;
c) separating the vapour and possible water drops created in step b) with a separator and leading the vapour to the condensor;
d) condensing the separated vapour from step c) into purified water in the condensor;
e) leading the purified water from step d) to a reservoir, preferably with a second pump.

In case a part of the waste water has not evaporated, the liquid fraction is eliminated by the separator and returned to the evaporator for further heating. Once it is in vapour state it can be condensed into purified water. The second pump could be omitted in the system if the construction allowed water flow based due to gravity into the reservoir for purified water. The solids are preferably transported to a waste canister on a spiral brush preferably mounted next to the heated pipe inside the evaporator.

Waste water treated with the system according to the invention is purified enough to allow use as rinsing water for bathroom and kitchen as well as flushing water in toilets and similar. The purified water could also be suitable for consummation in case the system is supplied with additional components, such as elements for sterilization, double condensation or other suitable water treatment for generation of drinking water. The quality of the purified water can be checked with external devices such as commercially available water quality meters, while the system according to the invention does not necessarily have a water quality meter as the water is not intended for consummation. Solid waste can be easily removed and dumped in regular trash, thereby eliminating the need for draining the waste water tanks of mobile homes at special dedicated locations.

The system for purifying waste water in mobile homes according to the invention will be described in more detail based on preferred embodiments and figures, which show:

FIG. 1 An embodiment of water installation in a motor-home

Figure 2:
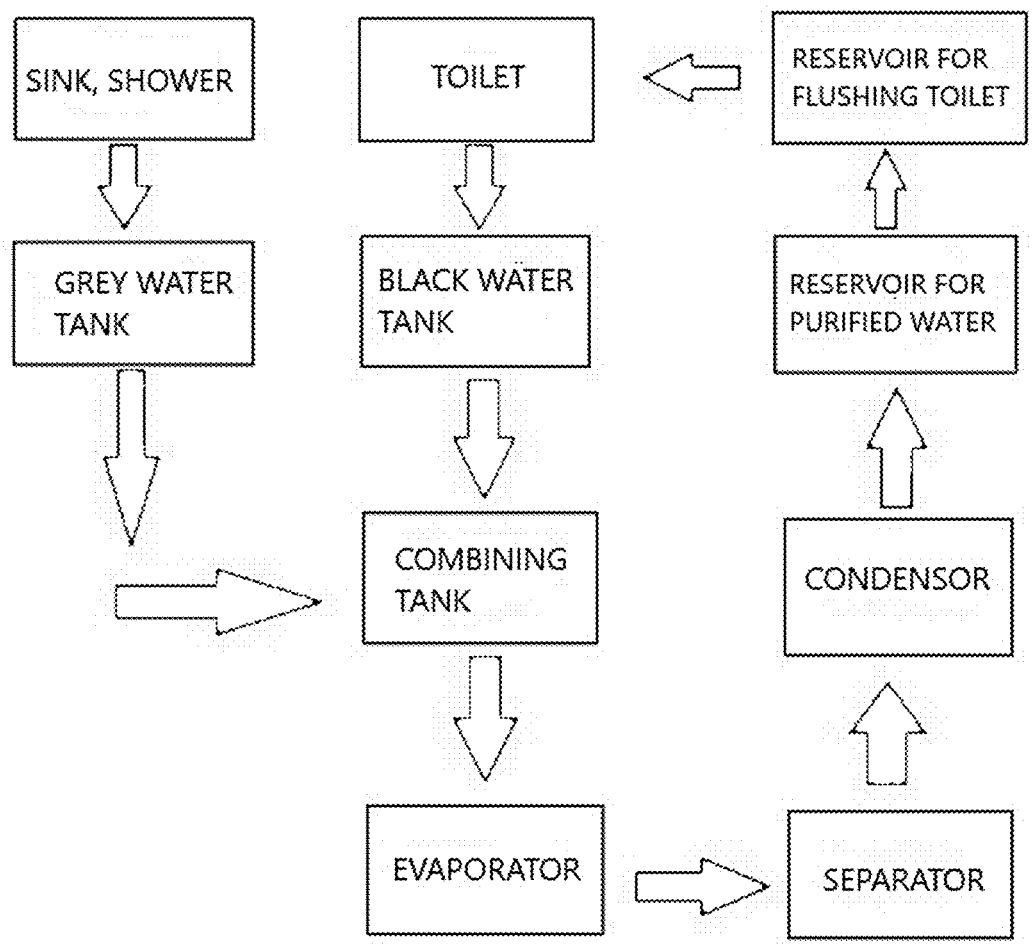
Figure 3:
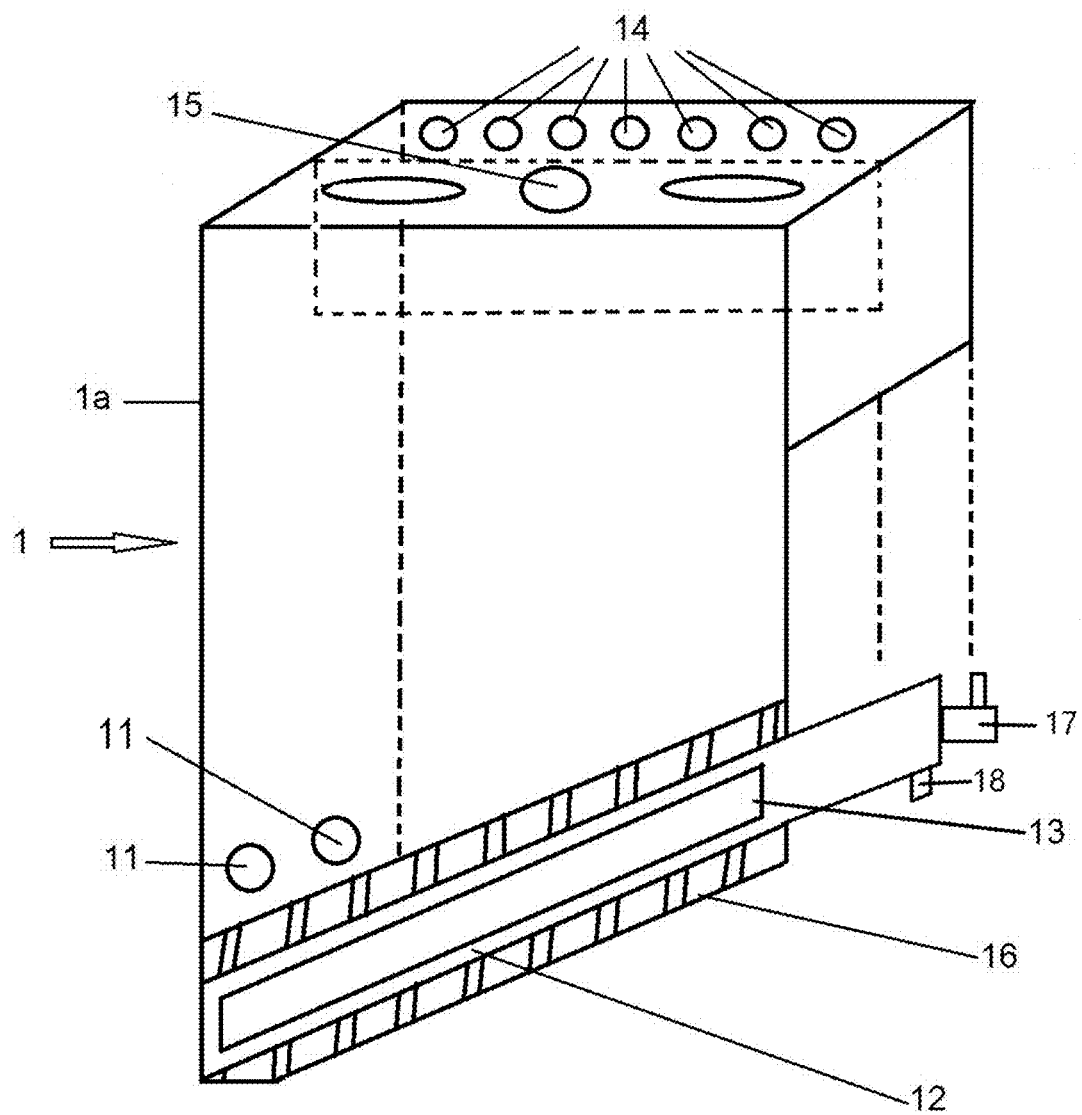
Figure 4:
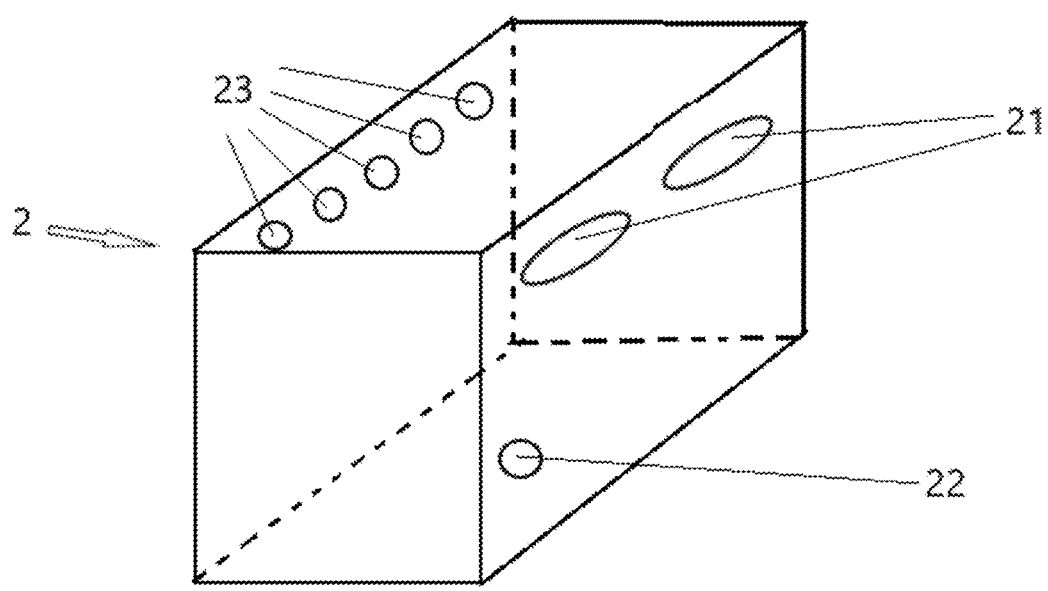

FIG. 2 A schematic view of the purifying method performed by the system according to the invention FIG. 3 A partly cut schematic view of a possible embodiment of the evaporator FIG. 4 A possible embodiment of the separator FIG. 1 shows a state-of-the-art motorhome water installation composed of interconnected freshwater tank with a pump for pumping the water into a water heater to provide fresh water in the kitchen and the bathroom part of the motorhome. Waste water flows from the kitchen and bathroom sinks into grey waste water reservoir. Shower sink is also connected to the grey water reservoir. In addition, the motorhome also has a black waste water tank for holding waste water from the toilet.

According to the invention the system for purifying waste water in mobile homes is provided with additional tanks for heat treatment of waste water. A possible embodiment of the invention is a system for purifying waste water installed in a mobile home, wherein the system comprises the following components:

- a combining tank water arranged to combine waste water from the black, grey or both waste water tanks;
- a pump for pumping the waste water from the combining tank into the evaporator, the pump having a mill and being connected to the combining tank with a first pipe;
- An evaporator having an electric heater for increasing the temperature of the waste water so that it vaporizes, the evaporator being connected to the combining tank with a second pipe, wherein the heating source heats a heated pipe inside the evaporator, and wherein the solid particles after evaporation are led to a container for solid waste with a conveyor, which is a brush installed on the heated pipe;
- a device for measuring the level of waste water installed on the outer side of the evaporator for measuring the level of waste water in the evaporator; the device having a magnetic switch, which turns on the pump when the water level is low and turns off the pump when the water level is high, wherein these values are pre-set depending on the evaporator size;
- a separator for separating the vapour and water drops, the separator being installed downstream of the evaporator;
- a condensor for condensing the vapour being installed downstream of the separator, the condensor being cooled by a suitable cooling device, preferably a fan;
- a reservoir for the purified water for collecting the condensed vapour; and
- a PLC electronic controller for controlling the treatment process performed by the system.

FIG. 2 shows a schematic view of the purifying method performed by the said system, wherein the arrows represent the direction of water flow. Waste waters from the black and grey waste water reservoirs are joined in the combining tank. From the grey and black water tanks the waste water is pumped into the combining tank and then to the evaporator where a suitable heat source heats the water to a temperature in the range between 110 and 140° C. When the waste water contacts the heated pipe in the evaporator, it is transformed into vapour, while solid particles and possible remaining water drops of unevaporated water are separated by the brush in the evaporator and in the separator, respectively. The vapour flows through the separator to the condensor, where it condenses into purified water, which is pumped to the reservoir for purified water connected to supply tanks, especially for rinsing the toilet of the motor home.

The evaporator 1 and the separator 2 as shown in FIGS. 3 and 4 are preferably stainless-steel containers, preferably attached to each other or made integrally as one piece. The evaporator 1 is provided with a housing 1a and has in its lower part an inlet 11 whole for the waste water coming from the combining tank. The heated pipe 12, inside which the suitable heating source 13 is installed, is mounted in the evaporator 1 in its bottom part, so that the generated vapour can move upwards. The upper part of the evaporator 1 has holes 14 allowing passage of the vapour to the separator. The solid parts are collected by the spiral brush 16 mounted on the pipe 12. A reducer 17 is provided for rotation of the heated pipe, while in the bottom part of the ending of the pipe 12 an outlet 18 for solid particles is provided. In addition, a power source (not shown) is provided powering the heating source and brush is provided and connected in known ways so as to allow functioning of the evaporator 1. The separator 2 as shown in FIG. 4 is provided with holes 21 for the vapour and liquids from the evaporator on one side, while the opposite side is provided with outlet holes 23 for leading the vapour into the condenser. The possible liquid fraction is led to the bottom of the separator, where an outlet 22 for liquids is provided in order to ensure the return of liquid fraction into the evaporator.

The invention claimed is:

1. A mobile home comprising a system for purifying waste water, the system comprising:
    a black water tank for waste water;
    a grey water tank for waste water
    a combining tank water arranged to combine waste water from the black and grey water tanks;
    an evaporator installed downstream of the combining tank, the evaporator having a heating source for increasing a temperature of the waste water for vaporizing the waste water, wherein the evaporator is connected to the combining tank with a second pipe,
    a pump for pumping the waste water either from the black and grey water tanks separately and/or from the combining tank into the evaporator, the pump having a mill and being connected to the black, or grey tank and combining lanks with pipes;
    a separator for separating vapour and water drops from the evaporator, the separator being installed downstream of the evaporator;
    a condensor for condensing the vapour being installed downstream of the separator, the condensor being cooled by a cooling device;
    a reservoir for water for collecting the condensed vapour; and
    optionally an electronic controller for controlling a treatment process performed by the system,
    wherein the combining lank is located upstream of the evaporator and is partly heated by steam generated in the evaporator in order to elevate the temperature of waste water in the combining tank,
    wherein the evaporator is arranged to process and divide the waste water into vapour, water drops, and into solid particles,
    wherein the temperature reached in the evaporator is in the range between 110° C. to 140° C., and
    wherein the solid particles after vaporization are lead to a container for solid waste with a conveyor within the conveyor, for temporary collection therein and emptied into regular trash.

2. The mobile home comprising a system for purifying waste water according to claim 1, wherein the evaporator is a canister made from a material resistant to rust, in which the heating source is housed.

3. The mobile home comprising a system for purifying waste water according to claim 1, wherein the heating source comprises an electric heater, oil burner, gas burner or a heater working on solar energy.

4. The mobile home comprising a system for purifying waste water according to claim 1, wherein the heating source heats an intermediate element in the evaporator, with which the waste water comes into contact.

5. The mobile home comprising a system for purifying waste water according to claim 1, wherein the separator is an empty container with holes in the direction of the evaporator and holes in the direction of the condensor.

6. The mobile home comprising a system for purifying waste water according to claim 1, wherein the conveyor for transporting solid particles created in the evaporator towards the container for waste, is a spiral brush mounted next to a heated pipe inside the evaporator.

7. The mobile home comprising a system for purifying waste water according to claim 1, the system further comprises a device for measuring the level of waste water installed on the outer side of the evaporator for measuring the level of waste water in the evaporator.

8. The mobile home comprising a system for purifying waste water according to claim 1, wherein pipes, which connect all components of the system comprise a material selected from the group consisting of copper, iron, plastic materials, glass materials, and carbon fibres, and wherein a pipe between the condensor and evaporator is made of copper.

9. The mobile home comprising a system for purifying waste water according to claim 1, wherein the electronic controller is a programmable logic controller (PLC), which controls the treatment process performed by the system, the heater in the evaporator and the pump based on the temperature of water in the evaporator, level of waste water in the evaporator and time.

10. A waste water purifying process performed by the system according to claim 1, the process comprising the following steps:
- step a)-the pump, having the mill, pumps the waste water from the grey waste water tank, the black waste water tank or the combining tank and through the second pipe into the evaporator;
- step b)-increasing the temperature in the evaporator and evaporating the pumped waste water, wherein the solids are transported into the container for waste;
- step c)-separating the vapour and water drops created in step b) with all separator and leading the vapour to the condensor;
- step e)-condensing the separated vapour from step c) into purified water in the condensor; and
- step e-leading the purified water from step d) to a reservoir, preferably with a second pump.

* * * * *